No. 777,962. Patented December 20, 1904.

UNITED STATES PATENT OFFICE.

ARTHUR LIEBRECHT, OF FRANKFORT-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

IODOXY COMPOUND AND PROCESS OF MAKING SAME.

SPECIFICATION forming part of Letters Patent No. 777,962, dated December 20, 1904.

Application filed August 10, 1904. Serial No. 220,221.

*To all whom it may concern:*

Be it known that I, ARTHUR LIEBRECHT, Ph. D., chemist, a citizen of the Empire of Germany, residing at Frankfort-on-the-Main, Germany, have invented certain new and useful Improvements in the Manufacture of Iodo Compounds, of which the following is a specification.

Whereas the iodoxy compounds of aromatic hydrocarbons have only a slight disinfecting action, the iodoxy compounds of phenol esters possess great antiseptic properties and may consequently be used in therapeutics on account of these properties. They are obtained by either directly oxidizing the corresponding iodin compounds into iodoxy compounds or after having transformed the former into iodo chlorid or iodoso compounds. As oxidizing agents are best suited chlorin, hypochlorous acid, or hypochlorates.

Example I: Five grams of para-iodo-anisol ($C_6H_4.OCH_3.I$) are shaken with one hundred cubic centimeters of a solution of hypochlorous acid, (one cubic centimeter = 0.04 HClO.) The product becomes yellow in consequence of the formation of iodo chlorid,

($C_6H_4.OCH_3ICl_2.$)

After some time further solutions of hypochlorous acid are added, and the whole is allowed to stand, while being shaken from time to time, until the yellow iodo chlorid is transformed into the white iodoxy compound, ($C_6H_4.OCH_3IO_2.$) It is then filtered, washed with water, alcohol, and ether, and recrystallized from acetic acid of fifty per cent. strength. When oxidizing for the hypochlorous acid also, hypochlorites or hypobromites which may contain alkali may be used or iodo-anisol may be suspended in water, and the chlorination and oxidation can be carried out by introducing chlorin.

Example II: Five grams of para-iodo-anisol are dissolved in fifty cubic centimeters of chloroform and transformed into iodo chlorid by introducing chlorin. The filtered and dried product is dissolved in pyridin, water being added, and then transformed into the iodoxy compound by introducing chlorin. Iodo-anisol may also be directly dissolved in pyridin and after adding water treated with chlorin.

Example III: The iodo chlorid obtained by the process of the first or second example becomes white by addition of water, dilute soda-lye, a solution of pyridin, &c. The iodoso compound ($C_6H_4.OCH_3.IO$) may also be obtained by introducing the calculated quantity of chlorin into a solution of iodo-anisol in pyridin diluted with some water. If the iodoso compound be treated with water and if steam is introduced, a transformation into iodo-anisol and iodoxy-anisol occurs. The iodo-anisol escapes with the steam, while the iodoxy-anisol remains.

Example IV: The iodoso-anisol obtained according to Example III is shaken with twenty times the quantity of hypochlorous acid, (one cubic centimeter = —0.035 grams HClO,) a solution of chlorid of lime, &c. The transformation of the iodoso compound into iodoxy compound occurs.

Example V: Five grams of para-iodo-phenetol are dissolved in fifty cubic centimeters of chloroform and transformed into iodo chlorid by introducing chlorin. The filtered product is dissolved in pyridin, water being added, and then transformed into the iodoxy compound by further introducing chlorin. The filtered product, washed with alcohol, is recrystallized from acetic acid of fifty per cent. strength.

Iodoxy-phenetol may also be prepared according to the process of the other example. Chlorin or hypochlorous acid may be produced electrochemically.

The iodo-chlorids are golden-yellow crystals which spontaneously change into iodo-anisol or iodo-phenetol chlorinated in the nucleus. They are readily soluble in pyridin, soluble with difficulty in chloroform, and insoluble in water.

The iodoso compounds are white crystals which decompose by themselves under formation of iodo and iodoxy compounds. They are soluble in pyridin, glacial acetic acid, and little soluble in alcohol.

Para-iodoxy-anisol, like para-idoxy-phenetol, crystallizes as white leaflets of silver luster insoluble in alcohol, ether, &c. They are soluble with difficulty in cold water, more readily in hot water, and may easily be recrystallized from acetic acid, formic acid, &c. The melting-point with simultaneous combustion is at about 225° centigrade.

The iodoxy compounds act readily as oxidizing agents. To this property, exercised also on animal tissues, is apparently due the strong antiseptic action.

Having now described my invention, what I claim is—

1. The herein-described process of making para-iodoxy compounds of phenetol esters, which consists in oxidizing the corresponding iodo compounds to iodoxy compounds.

2. As new products, the iodoxy compounds obtained as herein described, being white leaflets of silver luster, insoluble in alcohol, and ether, soluble with difficulty in cold water, more readily in hot water and easily recrystallized from acetic acid, formic acid and having the melting-point with simultaneous combustion at about 225° centigrade.

3. As a new product the iodoxy-anisol ($C_6H_4.OCH_3.IO_2$) obtained by oxidizing iodo-anisol, being white leaflets of silver luster, insoluble in alcohol and ether, soluble with difficulty in cold water, more readily in hot water and easily recrystallized from acetic acid and formic acid, having the melting-point with simultaneous combustion at about 225° centigrade.

In testimony that I claim the foregoing as my invention I have signed my name in presence of two subscribing witnesses.

ARTHUR LIEBRECHT.

Witnesses:
ALFRED BRISBOIS,
BERNHARD LYDECKER.